N. Richardson.
Steering.
No. 93,122. Patented July 27, 1869.
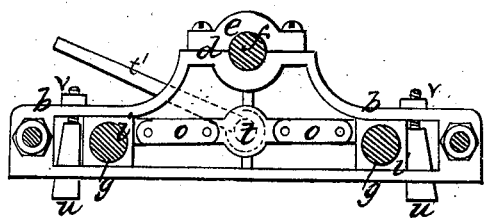
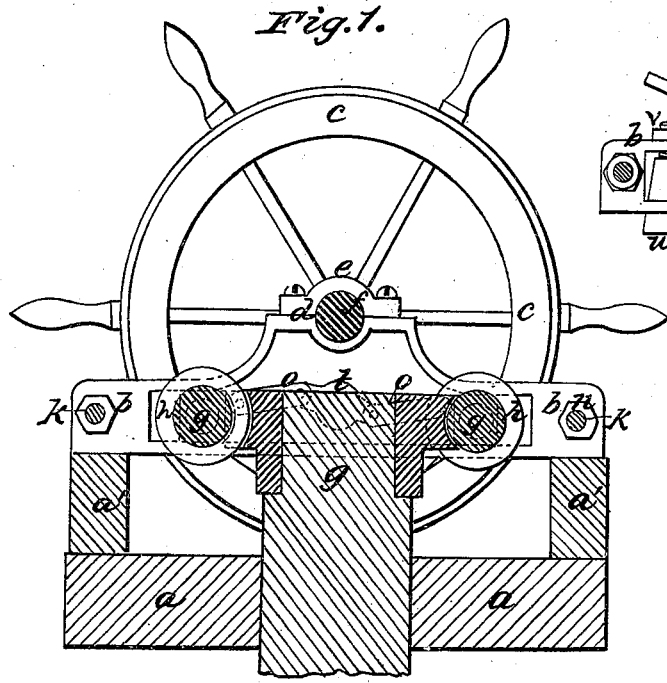
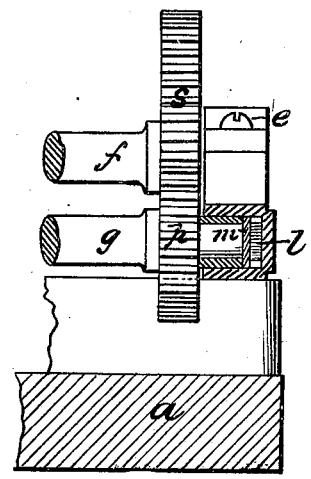
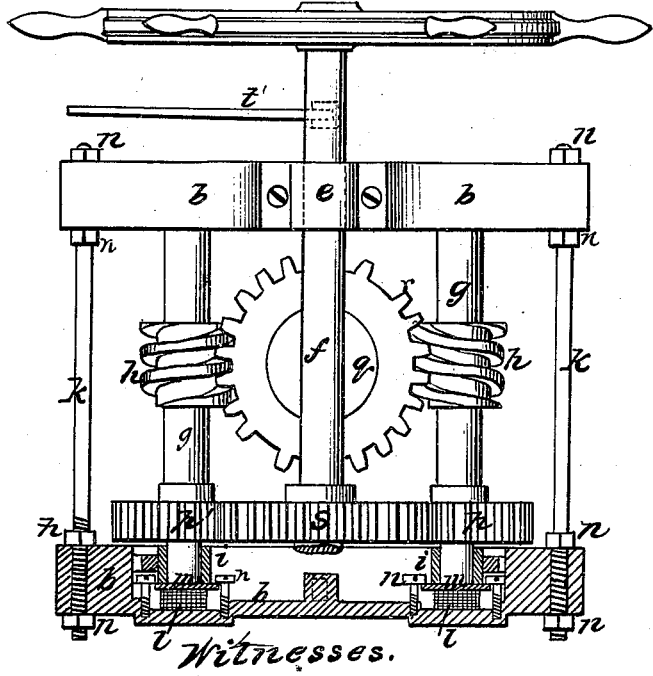
Witnesses.
M. S. G. Wilde.
C. L. Dyer.
Inventor:
N. Richardson
by J. H. Adams

United States Patent Office.

NATHAN RICHARDSON, OF GLOUCESTER, MASSACHUSETTS, ASSIGNOR TO HIMSELF AND ELI F. STACEY, OF SAME PLACE.

Letters Patent No. 93,122, dated July 27, 1869.

IMPROVED STEERING-APPARATUS.

The Schedule referred to in these Letters Patent and making part of the same.

Be it known that I, NATHAN RICHARDSON, of Gloucester, in the county of Essex, and State of Massachusetts, have invented certain new and useful Improvements in Steering-Apparatus, of which the following is a full, clear, and exact description, reference being had to the accompanying drawings, making a part of this specification, in which—

Figure 1 is a partial transverse section and end elevation of a steering-apparatus embodying my improvement;

Figure 2 is a transverse vertical section of a portion of the frame;

Figure 3 is a plan view and partial section of one end; and

Figure 4 is a view showing the arrangement of the end of the shafts.

My invention is designed as an improvement upon the apparatus for which a patent was granted me on August 1, 1865, and which related to matters of detail in the construction and arrangement of that class of steering-apparatus in which a worm or screw-gear wheel on the rudder-head is operated by worms or screws on opposite sides of the said rudder-head, and which worms or screws mesh into the teeth of the said wheels.

The object of my present invention or improvement is to provide a means for obviating many difficulties found to exist in the practical operation of the apparatus before referred to; and The nature of my invention consists in the employment of some elastic substance or material, placed at the ends of the shafts which carry the worm-gears, so as to prevent any injurious effect upon the gearing caused by the action of the water upon the rudder.

The invention also consists in providing a more ready means for holding the rudder-head fast in any given position, so as to prevent any motion of the same while the vessel is at anchor, or when employed in fishing or blockading-purposes, and of releasing the rudder-head at any moment from its confined position.

It was found in my original apparatus that the frame which held the boxes had a tendency to spread apart, causing too free a motion to the gearing and rudder. The set-screws also, which held the boxes of the shaft-bearings in place, were liable, when screwed up tightly, to cause the parts to bind and prevent easy play to the rudder, and the boxes being screwed on the outside of the plate were exposed to the weather, and otherwise liable to injury.

In my present improvement, the boxes are held in place by means of wedge-shaped keys which project below the frame, so that the wear upon the gears can be readily compensated for by screwing up the keys when necessary.

In the general construction and arrangement of the gearing and shafts, my present apparatus is similar to that described in the patent previously referred to.

In the drawings—

$a$ represents the deck of the vessel.

$a'$ $a'$ are two parallel timbers, upon which are supported the side frames that carry the operative portions of the apparatus.

$f$ represents the main shaft, to which are attached the wheel $c$ and the gear-wheel $s$.

$g$ $g$ are the two side shafts, carrying the worm-gears $h$ and gears $p$, and meshing, respectively, with the teeth $r$ $r$, on the rudder-head $q$, and with the main gear $s$.

$b$ $b$ represent two metal frames, of the form shown in section in fig. 3, in the central elevated portion of which is journalled the main shaft $f$.

The frames $b$ $b$ consist of hollow casings closed on the outer and upper sides, and open on the inside, thus forming a protection to the boxes and parts enclosed, while the same are quite accessible.

The boxes $i$ $i$ of the shafts $g$ $g$ are fitted snugly in the frame or casings $b$ $b$, but yet are allowed a lateral as well as a slight longitudinal motion with reference to or in connection with the shafts $g$ $g$.

The ends of shafts $g$ $g$ abut against plates $m$ $m$, that are held in position by means of the nuts $n$ $n$, as shown in fig. 2.

Between the plate $m$ and the side of the frame $b$ is a block of India rubber or other elastic material, $l$, so that in case of any sudden blow or concussion upon the rudder, the shafts $g$ $g$ will yield slightly in either direction longitudinally, and thus prevent any injury to the gearing.

The boxes $i$ $i$, which hold the ends of the shafts $g$ $g$ on one side of the frame, are attached, on their inner sides, to connecting-pieces $o$ $o$, which latter are also attached to the arms of a hub, $t$, as shown in fig. 3.

The hub $t$ is secured to a shaft which projects outside of the casing or frame $b$, and to the outer end of the said shaft is attached a handle or lever, $t'$.

By turning the hub $t$ in one or the other direction, the boxes $i$ $i$ will be moved forward or back, and thus the endless screws or worms $h$ $h$ may be readily drawn in close contact with the gear-wheel $q$ of the rudder-head, to hold the parts in position, and as readily released, when necessary.

Should the boxes $i$ $i$ become loosened by wear, they can be tightened by driving the wedges or keys $u$ $u$ upward, and securing them in position by means of the set-screws $r$ $r$, as seen in fig. 3.

The ends of the frames or casings $b$ $b$ are connected together by means of rods $k$ $k$, which are secured in place by means of nuts $n$ $n$, on the threaded ends of the said rods, the said nuts being placed, one on each side of the frame, so as to admit of the complete adjustment of the frames on either or both sides, as may be required.

What I claim as new, and desire to secure by Letters Patent, is—

1. The rubber blocks or equivalent elastic material interposed between the ends of the shafts $g\ g$ and frame, as and for the purpose set forth.

2. The combination, with the boxes $i\ i$ on one side of the frame, of the connecting-arms $o\ o$ and hub $t'$, the parts operating as and for the purpose set forth.

3. The combination of the wedges $u\ u$ and their nuts, with the boxes $i\ i$, as and for the purpose described.

In testimony whereof, I have signed my name to this specification, in the presence of two subscribing witnesses.

N. RICHARDSON.

Witnesses:
J. H. ADAMS,
EDWIN L. DYER.